(12) United States Patent
Reimelt et al.

(10) Patent No.: US 8,482,296 B2
(45) Date of Patent: Jul. 9, 2013

(54) APPARATUS FOR ASCERTAINING AND MONITORING FILL LEVEL OF MEDIUM IN A CONTAINER

(75) Inventors: Ralf Reimelt, Freiburg (DE); Dirk Osswald, Schopfheim (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 741 days.

(21) Appl. No.: 12/223,121

(22) PCT Filed: Jan. 8, 2007

(86) PCT No.: PCT/EP2007/050128
§ 371 (c)(1),
(2), (4) Date: Dec. 8, 2008

(87) PCT Pub. No.: WO2007/085518
PCT Pub. Date: Aug. 2, 2007

(65) Prior Publication Data
US 2009/0178478 A1 Jul. 16, 2009

(30) Foreign Application Priority Data
Jan. 25, 2006 (DE) .......................... 10 2006 003 742

(51) Int. Cl.
*G01R 27/04* (2006.01)
(52) U.S. Cl.
USPC .......................... 324/644; 324/124; 73/290 V
(58) Field of Classification Search
USPC ................ 73/290 V, 1.73; 324/533, 642, 644
See application file for complete search history.

(56) References Cited

U.S. PATENT DOCUMENTS

| 5,880,698 A | 3/1999 | Burger | |
|---|---|---|---|
| 6,834,546 B2 | 12/2004 | Edvardsson | |
| 2003/0151560 A1* | 8/2003 | Kienzle et al. | 343/786 |
| 2004/0173020 A1* | 9/2004 | Edvardsson | 73/290 V |

FOREIGN PATENT DOCUMENTS

| DE | 196 17 963 C2 | 11/1997 |
| DE | 199 44 103 A1 | 3/2001 |
| DE | 100 03 941 A1 | 8/2001 |
| DE | 100 49 995 A1 | 4/2002 |
| DE | 102 06 110 A1 | 8/2003 |
| DE | 20 2005 008 528 U1 | 9/2005 |
| EP | 1 069 649 A1 | 1/2001 |
| WO | WO 02/16889 A1 | 2/2002 |
| WO | WO 2004/076982 A2 | 9/2004 |

* cited by examiner

*Primary Examiner* — Jermele M Hollington
*Assistant Examiner* — Son Le
(74) *Attorney, Agent, or Firm* — Bacon & Thomas, PLLC (57) ABSTRACT

An apparatus for ascertaining and monitoring fill level of a medium in a container by means of a travel-time measuring method utilizing high-frequency measuring signals. An antenna having an antenna coupling region and an antenna region, or a waveguide having a probe coupling region and a probe measuring region extending into the container is included. Hollow spaces present in the antenna coupling region, in the antenna region, in the probe coupling region and/or in the probe measuring region are filled at least partially with a dielectric filling body. The dielectric filling body has internally at least one, hermetically sealed, reserved volume and the hermetically sealed, reserved volume is so embodied, that the dielectric filling body has a predetermined wave resistance and/or the high-frequency measuring signals have a predetermined propagation characteristic.

10 Claims, 6 Drawing Sheets

APPARATUS FOR ASCERTAINING AND MONITORING FILL LEVEL OF MEDIUM IN A CONTAINER

TECHNICAL FIELD

The invention relates to an apparatus for ascertaining and monitoring fill level of a medium in a container by means of a travel-time measuring method utilizing high-frequency measuring signals. The apparatus includes an antenna having an antenna coupling region and an antenna region, or a waveguide having a probe coupling region and a probe measuring region extending into the container, wherein hollow spaces present in the antenna coupling region, in the antenna region, in the probe coupling region and/or in the probe measuring region are at least partially filled with a dielectric filling body.

BACKGROUND DISCUSSION

Corresponding apparatuses for ascertaining and monitoring fill level in a container are frequently utilized in measuring devices of automation- and process-control-technology. For example, measuring devices are produced and sold by the assignee under the marks Levelflex and Micropilot, which work on the basis of the travel-time measuring method and serve for determining and/or monitoring a fill level of a medium in a container. In the guided microwave method, or the time-domain reflectometry or TDR measuring method (Time Domain Reflection), a high-frequency pulse is transmitted along a Sommerfeld or Goubau waveguide or along a coaxial waveguide, and is partially reflected back at a jump in the dielectric constant (the so-called DK-value) of the medium surrounding the waveguide. Additionally, in the freely radiating, travel-time measuring method, for example, microwaves are transmitted via a horn antenna into a free space, or process space, and the echo waves reflected on the surface of the medium are received back by the horn antenna following a distance-dependent travel time of the measuring signal. On the basis of the time period between the transmitting of the high-frequency pulses and the receipt of the reflected echo signals, the distance from the measuring device to the surface of the medium can be ascertained. Taking into consideration the geometry of the container interior, then the fill level of the medium is ascertained as a relative or absolute quantity. The travel-time measuring method can be divided into essentially two methods of ascertainment: The first method of ascertainment rests on a travel-time measurement, which a pulse sequence modulated signal requires for the traveled path; a second widely distributed method of ascertainment rests on determining the frequency difference between the currently transmitted, continuously frequency-modulated, high-frequency signal and the received, reflected, high-frequency signal (FMCW—Frequency-Modulated Continuous Wave). In general, in the following, no limitation to a certain method of ascertainment is intended.

These measuring devices of automation- and process-control-technology for ascertaining fill level are often utilized in processes with aggressive media. In order to protect the sensor units (such as e.g. a waveguide, a horn antenna or an array antenna) of the measuring devices from the high-frequency-technical, thermal and chemical influences of the medium, the sensor units are protected from the aggressive media by protective elements, such as e.g. a radom, or a filler body, of a resistant, dielectric material. The reason for the protection of the sensor unit by such protective elements is, on the one hand, to prevent the corrosion of parts of the sensor unit by the medium, and, on the other hand, to prevent the formation of solid accretions and condensate, for example, in the hollow spaces of a freely radiating antenna or in cavities of a coupling unit of the waveguide. The formation of solids accretions and condensate in the cavities of freely radiating antennas and waveguides, referred to generically as accretion formation, has a direct influence on the propagation characteristic and reflection behavior of the high-frequency measuring signals. Through the accretion formation, disturbance signals occur in the measurement signal, and such disturbance signals can cover the reflection signal of the fill level, making the measuring device no longer suitable for fill-level ascertainment. In order prevent accretion in these measurements-technically, highly sensitive areas of the sensor unit, such are completely filled by a microwave transmissive, dielectric material.

A horn antenna completely filled with a dielectric material for improving durability against high-frequency-technical, thermal and chemical influences of the medium is disclosed in the following patent documents.

In German Patent DE 100 40 943 A1, a horn antenna for fill-level measurement is presented, which is filled, at least partially, with a dielectric material.

In German Patent DE 100 57 441 A1, a horn antenna for a radar-device is disclosed, whose antenna is at least partially filled with a filling of a dielectric material filled and/or the entire horn antenna is filled and completely surrounded with a dielectric material. Furthermore, the filling is so embodied on the process-side, that it forms a flange plating as a sealing element.

Furthermore, waveguide coupling units at least partially filled with a filling body of a dielectric material are known from the following patent documents.

In German Patent DE 100 19 129 A1, an embodiment of a coupling unit filled with a dielectric material is disclosed, which is able, largely, to eliminate the influence, which a structural part and/or an accretion formation on the sensor have/has on the accuracy of measurement and measuring sensitivity of the sensor. This is achieved by the elongation of the dielectric filling body of the coupling unit, whereby the structural parts lie outside of the region, into which the electromagnetic waves are radiated.

In European Patent EP 1 069 649 A1, another embodiment of a waveguide with a simple construction is disclosed, which combines the advantages of a single-wire- and a multi-wire-waveguide, in that it shows no interaction with installed objects of the container, and is cleaned of accretions or deposits in simple manner. This was achieved by surrounding the multi-wire-waveguide in the process at least partially with a dielectric medium, whereby no accretion can form between the individual waveguides.

Disadvantageous in the case of all forms of embodiment of the protective elements of the sensor units in the state of the art is that the electromagnetic waves of a high-frequency measuring signal are strongly influenced by the dielectric material of the protective element.

SUMMARY OF THE INVENTION

An object of the invention is, therefore, to provide an apparatus, which has minimal influencing of the produced electromagnetic measuring signals and which, thus, increases the efficiency and accuracy of measurement of the apparatus.

The object is achieved in an embodiment of the invention by the features, that the dielectric filling body has in its interior at least one, hermetically sealed, reserved volume and that the hermetically sealed, reserved volume is so embodied that the dielectric filling body has a predetermined wave resistance and/or the high-frequency measuring signals have a predetermined propagation characteristic. Known in the state of the art are fill-level measuring devices having horn antennas or waveguides, whose hollow spaces in the antenna coupling region, in the antenna region, in the probe coupling region and/or in the probe measuring region are completely filled with a filling body of a dielectric material. Through this filling of the hollow spaces, no medium or environmental air of the process can collect in these areas, whereby, also, no accretion of medium or condensate formation can occur in the cavities. A disadvantage, however, is that the dielectric material of the dielectric filling body influences the wave resistance of the electromagnetic waves of the high-frequency measuring signal and, thus, also the efficiency of the coupling of the produced electromagnetic waves into the waveguide or into the horn antenna. For example, the coupling region of the waveguide should be so embodied, that the electromagnetic waves of the measuring signal produced in the transmitting/receiving unit are conveyed almost loss-free and are coupled without signal compromise into the rod/cable element. The same is true in the case of a horn antenna, in the case of which the electromagnetic waves of the measuring signal produced in the transmitting/receiving unit should be attenuated as little as possible by the dielectric filling body and their radiation characteristic changed as little as possibly by the dielectric filling body. In an area filled with air or with a special gas, electromagnetic waves are almost not influenced at all. In order to combine the advantages of the preventing, by a dielectric filling body, of accretion formation in the hollow spaces of fill-level measuring devices operating with electromagnetic waves and the small influencing of the electromagnetic waves in the case of transmission through air or a special gas, there is provided, according to the invention, a dielectric filling body, which completely fills the hollow spaces and has at least one, hermetically sealed, reserved volume, for the matching of wave resistance. Dielectric materials used in such case include, for example, technical ceramics and/or synthetic materials.

According to an especially preferred form of embodiment of the invention, it is provided, that the dielectric filling body is manufactured with at least one reserved volume of a synthetic material. Found to be advantageous is to manufacture the dielectric filling body of chemically resistant, synthetic material by means of an injection-molding method or the method of isostatic pressing.

In an additional, preferred form of embodiment of the invention, it is provided, that the dielectric filling body is made of a plurality of individual parts. In the injection-molding method for synthetic materials, it is very difficult to manufacture a dielectric filling body with an exactly defined, reserved volume. The same is true for a dielectric filling body of a ceramic material manufactured by any method. For this reason, it is, most often, necessary, to embody the dielectric filling body of at least two individual parts.

An efficient embodiment of the invention is one in which the individual parts of the dielectric filling body are hermetically sealedly joined together by means of a material-bonding, connection technology. The multi-part, dielectric filling body is joined together by means of a material-bonded connection, such as e.g. a welded or an adhesively bonded connection, so that at least one, hermetically sealed, reserved volume is formed in the interior. Ultrasonic welding technology is especially suitable here, in that the contact surfaces or connecting locations of the multi-part, dielectric filling body melt together by occurring, frictional heat.

An advantageous form of embodiment of the invention is to be seen in hermetically sealedly joining the individual parts of the dielectric filling body together by means of a force-fit connection.

A further connection technology is a force connection, wherein the multi-part, dielectric filling body is joined together by, for example, screws, rivets or a screwed connection, so that at least one, hermetically sealed, reserved volume forms in the interior.

According to an advantageous form of embodiment of the invention, it is provided, that a gas or a gas mixture is introduced into the reserved volume of the dielectric filling body. In order to check the state of sealing of the hermetically sealed, reserved volume, during the manufacturing process, a special gas, such as e.g. helium, is enclosed in the hermetically sealed, reserved volume of the filling body, and possibly escaping gas is measured with a leakage measuring device or a gas measuring device. Through this test, the state of sealing of the reserved volume can be checked in the case of multi-part embodiment. A further advantage of the introduction of a special gas is that moisture-bearing air is displaced out of the reserved volume by the dried and/or hydrophobic gas, whereby no condensate can form in the case of occurring temperature changes. Furthermore, by the use of special gases in the reserved volume, the wave resistance can be matched.

A further advantageous embodiment of the invention is that in which the reserved volume of the dielectric filling body is provided with a dielectric filling material of low dielectric constant not influencing the propagation characteristic of the high-frequency measuring signals.

Another variant making use of the reserved volume for matching the wave resistance of the filling body is one in which the reserved volume is filled with a dielectric solid or a dielectric liquid having a smaller dielectric constant than the material of the dielectric filling body. In this case, the hermetic state of sealing of the reserved volume of the dielectric filling body is also achieved by the complete filling with a dielectric filling material. Through introduction of a certain dielectric filling material into at least one reserved volume, is it possible, moreover, also, appropriately to match the radiation characteristic or propagation characteristic, for example, of the horn antenna or the coupling characteristics of the coupling unit of the waveguide.

An advantageous embodiment of the invention provides, that at least one support element is provided in the reserved volume of the dielectric filling body. For increasing the mechanical stability and the pressure resistance of the dielectric filling body with at least one reserved volume, supporting elements are introduced into the reserved volume for uniformly distributing mechanical forces acting outside on the dielectric filling body. The force spreading by the supporting elements is so embodied, that the shape of the dielectric filling body scarcely changes in the case of mechanical forces acting within a certain limiting range.

According to an advantageous form of embodiment of the invention, it is provided, that a probe securement element is supplied, which is arranged centered in the dielectric filling body and secured against twisting. The rod/cable element of the waveguide is held by the dielectric filling body. The securement of the rod/cable element is accomplished, for example, via a probe securement element, such as e.g. a hex-screw, introduced form-fittingly in the dielectric filling body, whereby the rod/cable element is exchangeable. Due to the shape-locking introduction of the probe securement element into the dielectric filler body, and of the dielectric filling body in the process connection housing, it is possible to effect a replacement of the rod/cable element by a simple counter-rotational movement of the process connection housing relative to the rod/cable element.

A very advantageous variant of the invention is that in which a dielectric, gas-sealed and/or hydrophobic coating is applied on the surface of the dielectric filling body. Through the coating of the dielectric filling body with a dielectric, gas-sealed and/or hydrophobic material, it is prevented, that a liquid medium or condensate can move by capillary action into a possible gap between the dielectric filling body and the horn antenna housing or the process connection housing. On the other hand, there should be created thereby, a diffusion barrier for preventing diffusion of the medium through the material of the dielectric filling body into the reserved volumes. A further opportunity is to provide the dielectric filling body in the regions, in which the electromagnetic waves of the measuring signals are conveyed and their radiation characteristic or wave resistance matched, with an electrically conductive coating. Through this conductive coating, medium or condensate penetrated into the gap cannot affect the wave resistance and reflection properties of the electromagnetic waves. This electrically conductive coating must be electrically conductively contacted on the horn antenna housing or the process connection housing.

BRIEF DESCRIPTION OF THE DRAWING

The invention will now be described and explained on the basis of reference to various examples of embodiments illustrated in the drawing. For simplification in the drawing, identical parts have been provided with equal reference characters. The figures of the drawing show as follows.

DETAILED DISCUSSION

Figure 1:
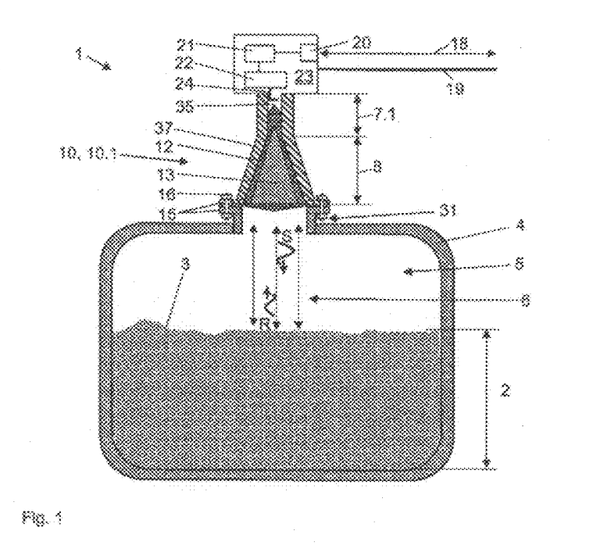
FIG. 1 a schematic, total drawing of an apparatus mounted on a container for ascertaining and monitoring fill level of a medium in a container by means of a horn antenna of the invention.
Figure 2:
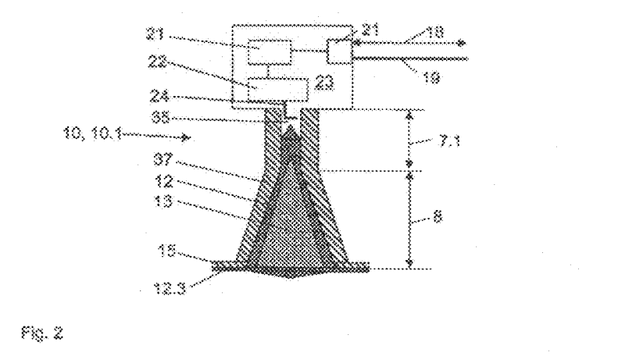
FIG. 2 a schematic drawing of a first form of embodiment of the apparatus with horn antenna.

FIG. 1 shows an example of application of the apparatus 1 of the invention, with an antenna 10, especially a horn antenna 10.1. The apparatus 1, or the measuring device, in FIG. 1 is mounted via securement elements 16 on a flange 15 on a nozzle 31 of the containment 4. The antenna 10 itself can be divided into two basic areas: The coupling region 7 and the antenna region 8.

The apparatus, or the measuring device, 1 includes a transmitting/receiving unit 22 in the measurement transmitter 23, where the high-frequency measuring signals 6 are produced. Via a coupling element 24, the high-frequency measuring signals 6 are guided into the coupling region 7 or the hollow conductor of the antenna 10 in a certain mode, e.g. TE-mode. The high-frequency measuring signals 6 coupled into the antenna 10 pass through the material of the dielectric filling body 12 and are radiated by the antenna 10 into the process space 5 with a predetermined radiation characteristic as transmission signals S. Most often, a radiation characteristic of the high-frequency measuring signals 6 with a planar wave-front is desired. This desired radiation characteristic of the high-frequency measuring signals 6 is achieved by appropriately matching the wave resistance and the propagation characteristic of the high-frequency measuring signals 6 in the antenna 10 on the basis of the embodiment of the dielectric filling body 12, for example, to include the reserved volumes 13 of the invention and/or to include matching elements 12.4. The high-frequency measuring signals 6 or transmission signals S transmitted into the process space 5 are reflected on a surface of the medium 3 and received back in the transmitting/receiving unit 22 in the measurement transmitter 23 as reflection signals R, following a certain travel time. Via the travel time of the high-frequency measuring signals 6 and by means of knowledge of the geometry of the containment 4, the fill level 2 of the medium 3 in the container 4 is determined.

The control/evaluating unit 21 in the measurement transmitter 23 has the task of evaluating the received, reflected echo, or the reflection signals R, of the high-frequency measuring signals 6, by further processing the high-frequency measuring signals 6 with the help of a signal processing facility and special signal evaluating algorithms and, out of the result of such, travel time, or the fill level 2, is determined.

Apparatus 1 is supplied with its needed energy via the supply line 19. The control/evaluating unit 21 communicates via a bus interface 20 and the fieldbus 18 with a remote control location and/or with additional apparatuses 1 or field devices, which are not explicitly shown. An additional supply line 19 for energy supply of the apparatus 1 is omitted, when apparatus 1 is a so-called two-conductor field device, where communication and energy supply is accomplished via the fieldbus 18 exclusively and simultaneously via a two-wire line. Data transmission or communication via the fieldbus 18 is accomplished, for example, on the basis of the CAN-, HART-, PROFIBUS DP-, PROFIBUS FMS-, PROFIBUS PA-, or FOUNDATION FIELDBUS-standard.

FIGS. 2 to 5 show a horn antenna 10.1, or a horn-shaped antenna, of the invention, made of an electrically conductive material, whose hollow space 35 is at least partially filled with a dielectric filling body 12. Thus, into the hollow spaces 35 of the horn antenna 10.1 is introduced a dielectric filling body 12, as a protective element or a process separating element for preventing accretion formation and corrosion. The flange-plating 12.3 shown here has, itself, turned out to be an advantageous sealing means for process space 5. The dielectric filling body 12, as passive element of the horn antenna 10.1, separates, sealed by the flange-plating 12.3 between the flanges 15 of the horn antenna housing 37 and the nozzle 31 of the containment 4, the active elements, such as the coupling unit 35 and the measurement transmitter 23, from the medium 3 in the process space 5. This dielectric filling body 12 prevents, as protective element or as process separating element, that the horn antenna 10.1 comes in direct contact with the medium 3 of the process, and that condensate forms in the hollow space 35. Horn antenna 10.1 is, for example, made of a metal, e.g. stainless steel or a conductive, synthetic material. Dielectric filling body 12 is manufactured of a dielectric material, especially polyether ketones (PEK, PEEK), polytetrafluoroethylene (PTFE) or perfluoroalkoxy-copolymer (PFA). Other suitable materials and their derivatives are, for example, polychlorotrifluoroethylene (PCTFE), ethylene-chlorotrifluoro-ethylene (ECTFE), ethylene-tetrafluoroethylene (ETFE), polyvinylidene fluoride (PVDF), polyvinyl fluoride (PVF), and fluorinated ethylene-propylene (FEP). These synthetic materials possess good chemical and physical, material-properties, such as e.g. durability against almost all chemicals, very high temperature resistance, good microwave transmissivity and good HF-performance, whereby these materials are predestined for application as dielectric filling body 12 in measuring devices of process measurements technology. The shaping of the dielectric filling body 12 is bounded by feasibility in manufacture. In the embodiment of the invention of the dielectric filling body 12 of the horn antenna 10.1, for better HF-performance or better matching of the wave resistance, at least one reserved volume 13 is introduced into the dielectric filling body 12. Manufacture of the dielectric filling body 12 is accomplished, on the basis of experience, by a chip removing method, i.e. machining, injection molding or isostatic pressing of the dielectric material or synthetic material. Preferably applied as manufacturing process is the injection molding of synthetic materials, such as, for example, polyetheretherketone. Due to the nature of the manufacturing process, no well-defined, closed reserved volumes 13 can be produced in the injection molded part of the dielectric filling body 12 during the injection-molding method. For these reasons, the dielectric filling body 12 is embodied as a plurality of individual parts, including a basic body 12.1 and a lid 12.2, which are possibly made of different materials. These individual parts are connected with a material-bonding, joining technology producing a durable, hermetically sealed joint 30.

There are various material-bonding, joining technologies, which can be considered for such an application, such as e.g. adhesion or welding of the connecting locations 30. It has proved itself as advantageous to join the connecting locations 30 of the respective parts of the dielectric filling body 12 by means of ultrasonic-welding technology. For this, the individual parts, e.g. the basic body 12.1 and the lid 12.2, are placed in contact under a defined pressure at the connecting locations 30. Then, at least one part, e.g. the lid 12.2, is caused via a vibration element to execute vibratory movement, whereby, by the frictional heat, a locally limited, melting process of the material is brought about and a welding of the parts takes place at the connecting locations 30. Advantageously, the welding procedure is performed under a dry, protective-gas atmosphere, so that this dry gas gets trapped in the reserved volumes 13 of the welded, dielectric filling body 12 under a certain pressure, or a dry gas, e.g. nitrogen, helium, argon, is specially introduced into the reserved volumes 13. This gas has two functions: On the one hand, water-bearing air is pushed out of the reserved volumes 13 by this gas, so that, in the case of a temperature change, no condensate can form therein; and, on the other hand, the state of sealing of the welding at the connecting locations 30 can be checked by means of this gas. For this, escaping gas is detected in the production process with a gas-sensor as a result of diffusion or leakage out of the welded, dielectric, filling body 12. Attention is paid in the gas selection, that the high-frequency measurement signal 6 is influenced as little as possible by it.

Also usable as additional filling material of the dielectric filling body 12 are particular liquids and solids having a low dielectric constant $\in_r$, which do not, or only slightly, influence the high-frequency measurement signal 6.

Figure 11:
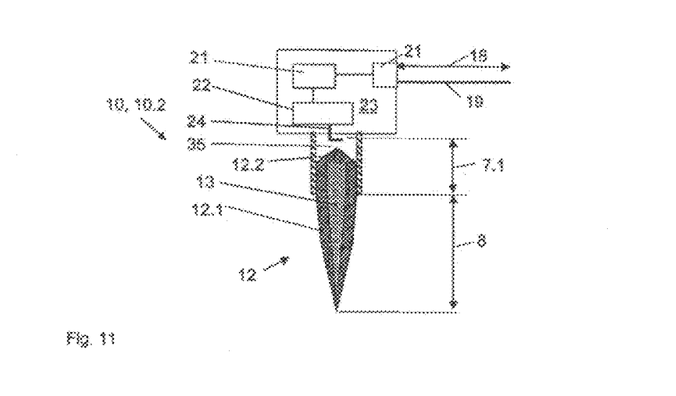
FIG. 11 a schematic drawing of a fourth form of embodiment of the apparatus with a dielectric spike-radiator.

The invention is also applicable in the case of so-called dielectric, spike radiators 10.2, or rod radiators, as explicitly illustrated in FIG. 11. The antenna element radiating the high-frequency measuring signals 6 into the process space 5 is, in the case of such a dielectric, spike radiator, embodied as a rod of dielectric material. In order to match the radiation characteristic of the high-frequency measuring signals of the radiating antennas 10, this radiating element is embodied, in some respects, as a dielectric filling body 12 with a suitable, hermetically sealed, reserved volume 13, in the hollow space 35 of the antenna coupling region 7.1. The spike radiator 10.2 is, for example, constructed of a basic body 12.1 and a lid 12.2, which are connected hermetically sealedly with one another, or it is manufactured as a single piece by means of an injection-molding method. The disclosure of the connection technology of the basic body 12.1 with the lid 12.2 and the driving by the measurement transmitter, as well as construction, is here not more explicitly detailed and are to be taken from the other parts of this description.

Figures 3, 4:
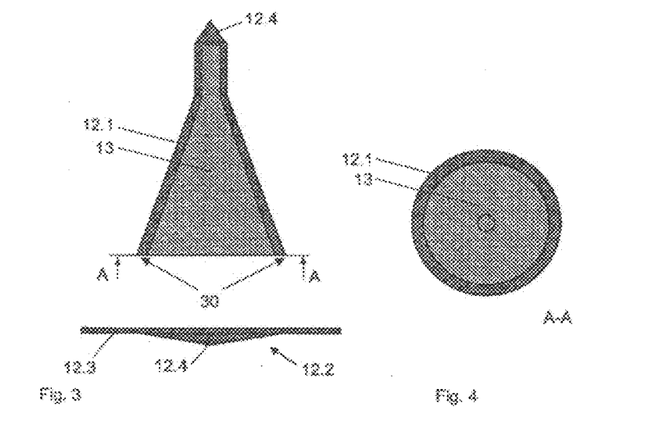
FIG. 3 a schematic drawing of a first form of embodiment of the multi-part dielectric filling body of the horn antenna of FIG. 2.
FIG. 4 a sectional view of the first form of embodiment according to the cutting plane A-A in FIG. 3.
Figures 5, 6:
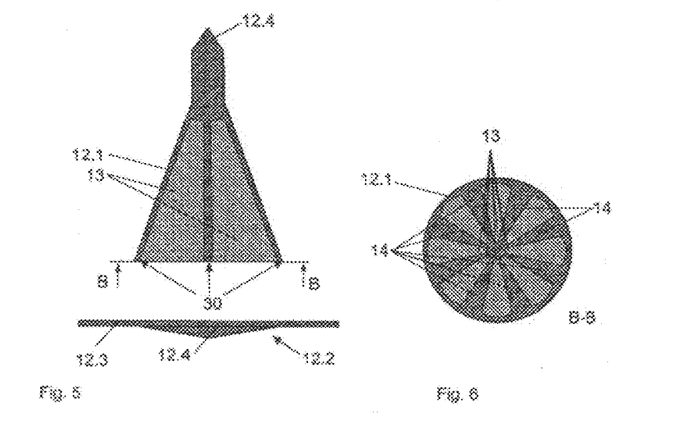
FIG. 5 a schematic drawing of a second form of embodiment of the multi-part dielectric filling body of the horn antenna.
FIG. 6 a sectional view of the second form of embodiment according to the cutting plane B-B in FIG. 5.

FIGS. 3 and 4 show an example of an embodiment of the dielectric filling body 12, wherein a basic body 12.1 is completely hollowed out by a reserved volume 13, so that only a thin wall still remains. In this form of embodiment, the matching of the wave resistance of the horn antenna 10.1 is optimized in an embodiment as horn antenna; however, the dielectric filling body 12 has no overly high mechanical stability and pressure resistance. A measuring device with a horn antenna 10.1, having such a dielectric filling body 12, can be applied in a process where no large pressures and temperature changes are to be expected. In order to increase the pressure resistance and the mechanical stability of the dielectric filling body 12, supporting elements 14 have been introduced in the reserved volumes 13 in FIGS. 5 and 6. Since this example involves a frustoconically shaped horn antenna, the supporting elements 14 for mechanical stabilization are radially symmetrically arranged in spoke-form. However, also other embodiments of support elements 14 can be applied.

Another form of embodiment of the invention not explicitly detailed in the drawings is to close the dielectric filling body 12, manufactured e.g. by injection molding and having reserved volumes 13 partially open to the process atmosphere, with a suitable, selectively permeable membrane, or diaphragm. This membrane, or diaphragm, enables, on the one hand, a gas-molecule exchange and, on the other hand, water cannot pass into the reserved volume 13.

In order to assure a reflection-poor, wave-resistance-matched transition between the dielectric filling body 12 and the adjoining process space 5, the side of the dielectric filling body 12 facing the process space 5 is embodied as matching element 12.4, which, for example, has the shape of a truncated cone. In this way, phase differences, such as can arise during passing through the horn geometry, between particular wave regions are equalized, and the high-frequency measuring signals 6 are radiated as transmission signal S with a planar wave-front. Other options are, however, to provide also planar, convex or concave transition geometries for forming of the desired radiation characteristic.

The high-frequency measurement signal 6 is, as illustrated in FIG. 1, injected via a coupling element 24 embodied as a round or rectangular, hollow conductor in the coupling region 7. Preferably, the hollow conductor, or the coupling region 7, is so embodied, that a TE-wave mode forms. In this coupling region 7, the dielectric filling body 12 is, in turn, equipped with a matching element 12.4, e.g. a cone tip or a stepped pyramid, in order to assure a good matching from the air filled, hollow conductor to the dielectric material filled, hollow conductor. Through the matching in the coupling region 7 of the horn antenna 10.1, it is prevented, that, already in this coupling region 7, the injected, high-frequency, measurement signal 6 is partially reflected back and, thus, attenuated. The coupling region 7 of the horn antenna 10.1 can also be completely filled by the dielectric material of the dielectric filling body 12.

Figure 7:
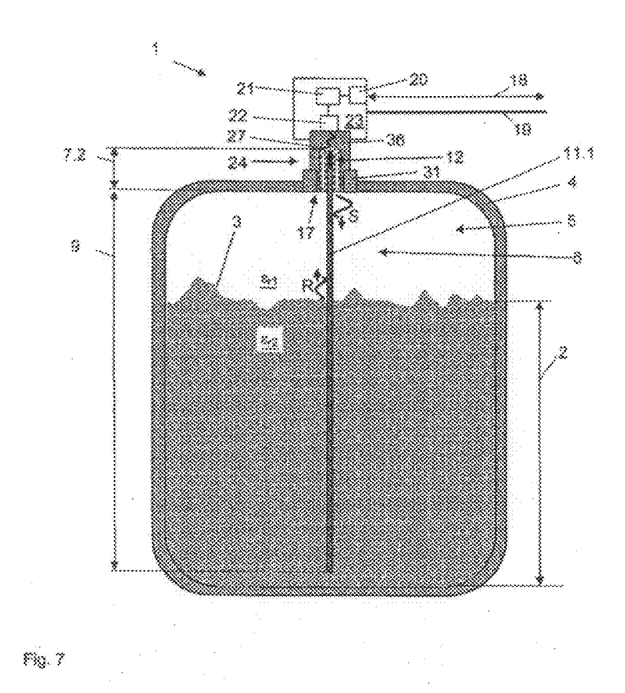
FIG. 7 a schematic, total drawing of an apparatus mounted on a container for ascertaining and monitoring fill level of a medium in a container by means of a waveguide of the invention.

FIG. 7 shows an example of application of an apparatus 1 of the invention as a time-domain reflectometer, or TDR-measuring system, for ascertaining the continuous fill level 2 of a medium 3 in a container 4 with a waveguide 11. The apparatus 1 ascertains, using the travel-time measuring method, the fill level 2 of a medium 3 or of a fill substance in the container 4. The waveguide 11 can basically be divided into two regions: The coupling region 7 and the probe measuring region 9. This apparatus 1 is, for example, mounted, via a screw-in 17, in an opening of the containment 4. The electromagnetic waves of the high-frequency measuring signal 6 are guided via a coaxially embodied, coupling region 7 through the region of the nozzle 31 or the screw-in 17 and coupled into the rod- and cable-shaped, probe measuring region 9 in the process space 5 of the containment 4 on the rod/cable element 11.1. Through the coaxial embodiment of the coupling region 7, a TEM-mode of the high-frequency measuring signals 6 forms, which represents a preferred embodiment for almost loss-less and disturbance-free transferring of the high-frequency measuring signals 6. In probe measuring region 9 of the waveguide 11, a $TM_{01}$-mode is produced in the near-field region of the rod/cable element 11.1 for optimal measuring of the fill level 2 of a medium 3 in a container 4.

The TDR-measuring method works on following measuring principle: Via the probe measuring region 9 of the waveguide 11, the electromagnetic waves of the high-frequency measuring signal 6, which are guided by the skin-effect in the near-field region of the rod/cable element 11.1 of the waveguide 11, or, in other words, along the surface of the rod/cable element 11.1, are guided in direction of the medium 3 or the process space 5 as transmission signals S. The energy fractions of the high-frequency transmission signal S are reflected at least partially back, as reflection signals R, at a jump of the dielectric constant $\in_r$ of the surrounding medium 3 and a change of the wave resistance associated therewith. The reflection signals R travel in the opposite direction on the waveguide 11, back to the transmitting/receiving unit 22. This discontinuity is present, for example, when the first dielectric constant $\in_{r1}$ of the gas phase, especially air $\in_{r1} \approx 1$, superimposed on the medium 3 is smaller than the second dielectric constant $\in_{r2}$ of the medium 3. Via the measured travel time of the high-frequency measuring signal 6, by a manipulation of the formula for the wave velocity, the traveled distance is ascertained. This distance difference corresponds to the height of the containment 4 minus the level of the fill level 2 of the medium 3 in the container 4. The height of the containment 4 or the position of the coupling of the high-frequency measuring signal 6 is assumed as known, whereby the fill level 2 in the container 4 can be ascertained by a simple subtraction of the measured traveled distance of the high-frequency measuring signal 6 from the height of the containment 4.

Figure 8:
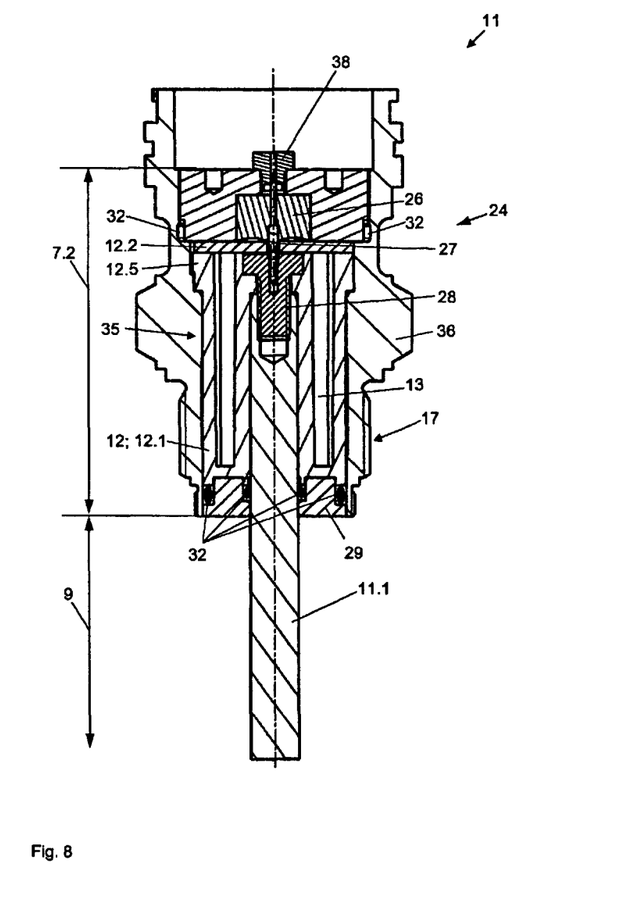
FIG. 8 a schematic, sectional illustration of a third form of embodiment of the apparatus with waveguide.

The electromagnetic waves of the measuring signal 6 are, for example, produced as pulses with a bandwidth of 0-1.5 GHz in the transmitting/receiving unit 22 and coupled by means of a coupling element 24 as a transmission signal S onto a waveguide 11, e.g. a Sommerfeld waveguide, such as shown in FIGS. 7 and 8. Usable also are coaxial cables, microstrip conductors or coaxial and parallel arrangements of a plurality of rod/cable elements 11.1, which, however, are not shown explicitly in the drawings. The reflection signals R on the rod/cable element 11.1 of the waveguide 11, traveling back due to the discontinuity of the dielectric constant $\in_r$ of the surrounding medium 3, are, in turn, received and preprocessed in the transmitting/receiving unit 22. The preprocessed reflection signals R are measurements-technically and signal-technically evaluated and so conditioned in the control/evaluating unit 12, that the measured value of the fill level 2 or an echo-curve signal, which represents the conditioned envelope-curve of the reflection signals R, is forwarded via a bus interface 20 on the fieldbus 18 to, for example, a control station.

FIG. 8 shows the waveguide 11 with the coupling element 24 and the rod/cable element 11.1 of FIG. 7 enlarged and presented as a detail in a sectional illustration. The coupling region 7 of the waveguide 11 is embodied in the form of a coaxial conductor-construction, for example, having a conductive process connection housing 36 as outer conductor and a conductive rod/cable element 11.1 as inner conductor. Rod/cable element 11.1 is embedded in the coupling region 7 in a dielectric filling body 12 of a dielectric material, which positions the rod/cable element 11.1 centered in the hollow space 35 of the process connection housing 36. Via a probe securement element 28, the rod/cable element 11.1 is held secured against twisting and exchangeably in the basic body 12.1 of the dielectric filling body 12. Probe securement element 28 is, for example, an ordinary hex-screw, which has been provided in the end surface of the screw head with a bore, in which is seated the probe coupling 27, for example, in the form of a spring-seated pin, which in-couples the high-frequency measurement signal 6. Via means (not explicitly shown in the drawing) in the form of an external thread on the probe securement element 28 and a suitable blind-hole thread in the rod/cable element 11.1, both are connected with one another, under force, electrically conductingly and with the basic body 12.1 of the dielectric filling body 12. Provided on the basic body 12.1 is a twist-preventer 12.5 in the form of a protrusion or indentation, which form-fittingly sits in a corresponding counterpiece in the wall of the hollow space 35 of the process connection housing 36 and, thus, prevents twisting of the dielectric filling body in the process connection housing 36. The basic body 12.1 of the dielectric filling body 12 with the therein buried, probe securement element 28 is, for example, welded via an ultrasonic welding method with a lid 12.2, so that the reserved volumes 13 in the basic body 12.1 are sealed hermetically. The dielectric filling body 12 can naturally also be embodied as a single piece. These reserved volumes 13 are introduced into the basic body 12 of the dielectric filling body 12, in order to improve the HF-performance of the coupling element 24 and, thus, to minimize disturbance reflections of the high-frequency measuring signal 6 due to the dielectric material of the dielectric filling body 12.

The probe coupling 27 contacting the probe securement element 28 is introduced into a glass feedthrough 26, which enables a gas-sealed process separation for the electronics of the measurement transmitter 23. Towards the side facing the measurement transmitter 23, the probe coupling is sealed, for example, via a coax-plug 38. Applied on the process-side, before the basic body 12.1, is, for example, a baffle 29 of a resistant and temperature-stable material, such as e.g. a ceramic, with sealing elements 32, such as e.g. O-rings. This baffle has, on the one hand, the task of keeping aggressive media 3 or high temperatures, which alter the material of the dielectric filling body 12, away from the dielectric filling body 12, and, on the other hand, the task of forming a clean process connection, which allows no impurities in the process space 5 or in the medium 3 to reach the material of the dielectric filling body 12.

Materials for the dielectric filling body 12 were already described in detail in conjunction with FIG. 1.

Figure 9:
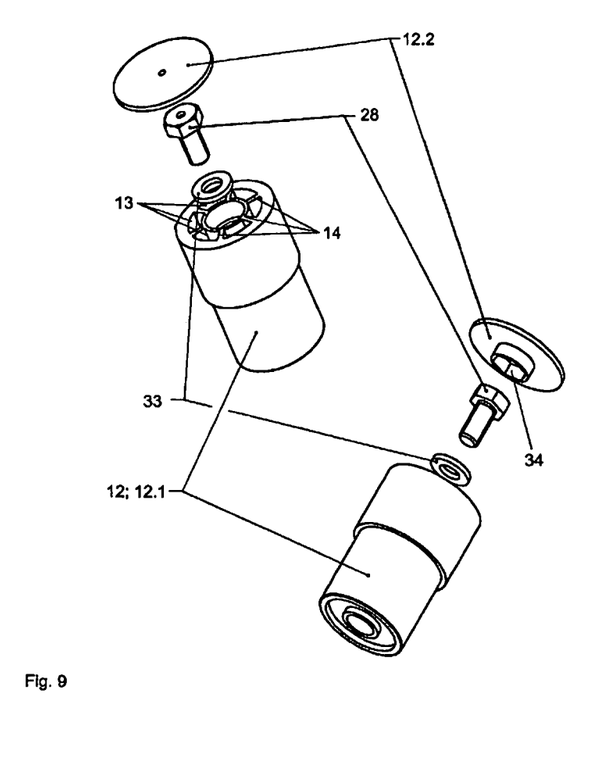
FIG. 9 a perspective drawing of the third example of an embodiment of the dielectric filling body of FIG. 8.
Figure 10:
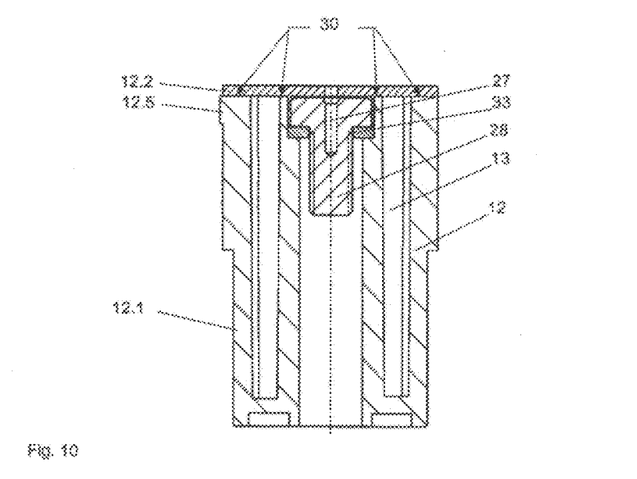
FIG. 10 a schematic, sectional illustration of the third example of an embodiment of the dielectric filling body of FIG. 8.

FIGS. 9 and 10 show the dielectric filling body 12 in two different views. FIG. 9 provides two, three-dimensional, exploded views from different viewing angles, whereby different aspects of the subject matter of the invention are more clearly shown. The filling body 12 there is composed essentially of a basic body 12.1 with reserved volumes 13 and support elements 14, and a lid 12.2. Both parts are connected with one another at the connecting locations 30, or contact points, via a material-bonding, joining method, such as already described above, or they are embodied as a one-piece, dielectric, filling body 12. The probe securement element 28 is positioned with an underlay washer 33, centered in a reserved volume in the basic body 12.1. Via a shape-interlocking, locking element 34, which, as shown, is located on the lid 12.2, but which, also, could be located in the basic body 12.1 itself, the probe securement element 28, or the hex-screw, is emplaced, secured against twisting. The rod/cable element 11.1 can, thus, be screwed-in, without it being necessary to apply any tool directly to the probe securement element 28: It can be screwed-in by a corresponding affixing of the total coupling element 24.

The invention claimed is:

1. An apparatus for ascertaining and monitoring fill level of a medium in a container by means of a travel-time measuring method utilizing high-frequency measuring signals, comprising an antenna having an antenna coupling region and an antenna region, or a waveguide having a probe coupling region and a probe measuring region extending into the container, wherein:

said antenna coupling region, said antenna region, said probe coupling region and/or said probe measuring region have hollow spaces which are at least partially filled with a dielectric filling body; and said dielectric filling body has internally at least one, hermetically sealed closed, cavity volume, wherein the dielectric filling body is completely hollowed out by a closed cavity volume, so that only a thin wall still remains, and the hermetically sealed, closed cavity volume is so embodied, that the dielectric filling body has a predetermined wave resistance and/or the high-frequency measuring signals have a predetermined propagation characteristic.

2. The apparatus as claimed in claim 1, wherein:
said dielectric filling body is manufactured of a synthetic material.

3. The apparatus as claimed in claim 1, wherein:
said dielectric filling body is composed of a plurality of individual parts.

4. The apparatus as claimed in claim 3, wherein:
said individual parts of the dielectric filling body are hermetically sealedly joined together by means of a material-bonding, connection technology.

5. The apparatus as claimed in claim 3, wherein:
said individual parts of the dielectric filling body are hermetically sealedly joined together by means of a force connection technology.

6. The apparatus as claimed in claim 1, wherein:
a gas or a gas mixture is introduced into said closed cavity volume of said dielectric filling body.

7. The apparatus as claimed in claim 1, wherein:
a dielectric filling material with a low dielectric constant is provided in said closed cavity volume of said dielectric filling body, in order not to influence the propagation characteristic of the high-frequency measuring signals.

8. The apparatus as claimed in claim 1, wherein:
at least one support element is provided in said closed cavity volume of said dielectric filling body.

9. The apparatus as claimed in claim 1, wherein:
a probe securement element is provided, which is arranged secured against twisting and centered in said dielectric filling body.

10. The apparatus as claimed in claim 1, wherein:
a dielectric, gas-sealed and/or hydrophobic coating is applied on the surface of said dielectric filling body.

* * * * *